Oct. 18, 1960 C. L. RALL 2,956,541
MEANS FOR INSTRUCTING A PERSON TO SWIM
Filed Jan. 26, 1960
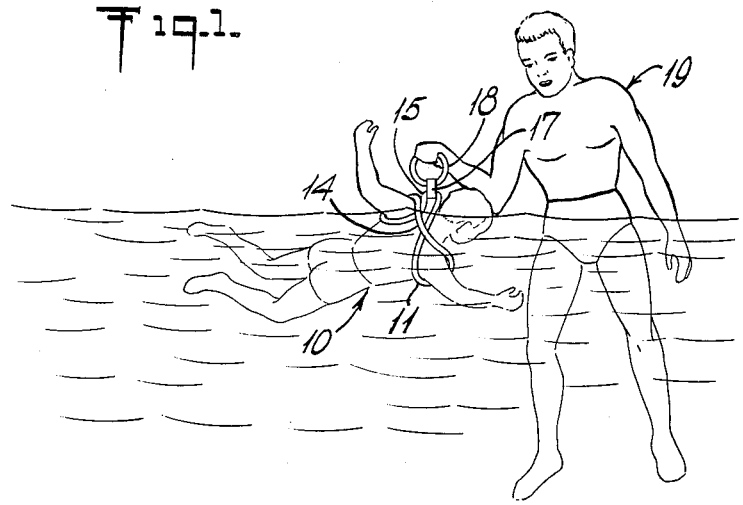
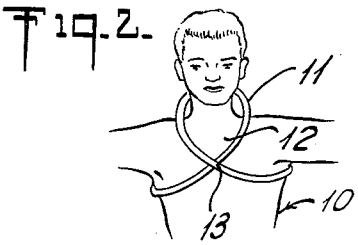
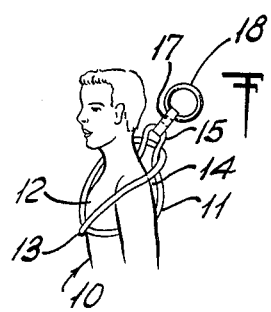
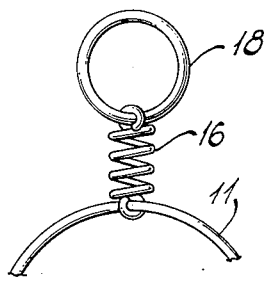
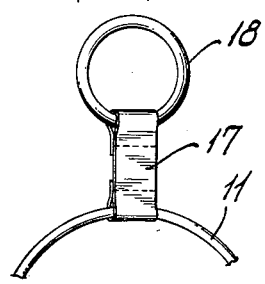
INVENTOR
CLIFFORD L. RALL
BY
*Eugene S. Lovette*
ATTORNEY United States Patent Office 2,956,541
Patented Oct. 18, 1960

2,956,541
MEANS FOR INSTRUCTING A PERSON TO SWIM
Clifford L. Rall, 680 Westbury Ave., Westbury, N.Y.
Filed Jan. 26, 1960, Ser. No. 4,796
1 Claim. (Cl. 119—96)

The present invention relates to a method of teaching a learner to swim with the use of an improved swimming instruction device and, in particular, to a method and means whereby the learner may be supported in floating relationship in water with the aid of an instructor who then can readily teach the learner the fundamentals of floating and swimming.

It is the principal object of this invention to provide a swimming instruction device which may be used with equal effectiveness to teach a child or an adult to swim and, in particular, to help such child or adult learner to overcome the fear of sinking normally associated with a learner's attempt to swim. The invention contemplates a simple harness device worn by the learner, which device includes resilient tensile means to permit an instructor to support the learner in floating relationship in water as the learner is gradually becoming proficient in floating and swimming and overcoming the fear of sinking in water. When teaching a person how to swim in accordance with the practice of the invention, the instructor at the beginning completely supports the learner in floating position in the water. After some skill has been acquired by the learner, the instructor gradually slackens his support until the learner is capable of sustaining himself in the water with sufficient confidence and proficiency to discard the device.

Accordingly, it is another object of the invention to provide a swimming instruction device whereby the learner can be supported in floating relationship in water by an instructor without sudden or frightening movements and the support given by the instructor can be smoothly varied and regulated in accordance with the ability of the learner to sustain himself in floating position.

It is a further object of the invention to provide a light weight and relatively simple harness device to be fastened around a person who is learning how to swim and to suspend such person by means of a resilient device related to the weight of the learner, whereby the learner can remain afloat by using a basic stroke such as a dog paddle or any stroke which comes natural to the learner. In accordance with the invention, resilient means is inserted between the harness which surrounds the learner and a handle gripped by the instructor so that the support rendered by the instructor may be smoothly varied and regulated. The invention also resides in its effectiveness as a teaching device because it permits the instructor to slacken his support of the learner without the learner being conscious of this action.

It is a further object of the invention to provide a swimming instruction device which is relatively inexpensive to fabricate and use and which may be used effectively either by an expert swimming instructor or by parents who wish to instruct their youngsters to swim, even though the parents themselves may not be swimmers.

Further objects and advantages will become apparent from the following description of the invention taken in conjunction with the figures, in which:

Fig. 1 is a front view showing an instructor supporting a learner in water and employing a swimming instruction device in accordance with the invention;

Fig. 2 is a front view of the learner wearing the device shown in Fig. 1;

Fig. 3 is a side view of a learner wearing the device shown in Fig. 1;

Fig. 4 is a front view of the spring resilient means and handle shown attached to a harness in accordance with the invention; and Fig. 5 shows an elastic band used in lieu of the spring means shown in Fig. 4.

Reference is now made to the figures and, in particular, to Figs. 1, 2 and 3 which illustrate a person 10 wearing a harness device 11 in accordance with the invention. In order to minimize interference with the learner's freedom of arm, head and body movement during floating and swimming as well as reduce the learner's awareness of the presence of the harness, harness device 11 is characterized by light weight material and simplicity of design. The figures illustrate a harness of preferred design for satisfying these requirements, wherein harness 11 is a continuous loop made of soft, light-weight and pliable material, such as cloth, plastic either tubular or rectangular in section, or other suitable material. Harness 11 is twisted to form a first loop 12 which fits over the learner's head and crossed over, 13, at the chest so that the individual segments thereof extend under the learner's arms to define a second loop 14 which is threaded through the first loop 12 as its end 15 extends upwardly behind the learner's head as depicted in Fig. 3. Harness 11 is sufficiently long so that it will fit loosely on the upper torso of the learner without restricting arm, head or body movement. One end of resilient tensile means, such as a coil spring 16, shown in Fig. 4 or a wide elastic band 17 shown in Fig. 5, is slidably attached to harness 11. During use, the resilient means is in the position as shown in Fig. 3, whereby the spring 16 or band 17 extends upwardly behind the learner's head. The other end of the resilient means attaches to a handle 18 of any convenient design. Elastic band 17 may be of any suitable material and attached to harness 11 and handle 18 by stitching.

To mount harness 11, the learner or instructor (reference 19) loops the harness around the learner's back whereby diametrically opposite segments of the harness individually extend underneath the learner's arm to form loop 14. The harness is then crossed over at the front of the learner's chest to form loop 12, the upper end of which is mounted over the learner's head. The learner or with the help of the instructor, threads loop end 15 upwardly between loop 12 and the learner's head. The handle band 17 is slid along harness 11 until it is at loop end 15 to be gripped as shown in Figs. 1 and 3.

In operation, it is preferable to start the learner in relatively shallow water, for example 3½ to 5 feet deep, and this be at a pool, or at an ocean or lake beach. As the learner assumes a floating or swimming position on his stomach, the instructor stands or walks alongside the learner and pulls upwardly on handle 18 to support the learner in floating relationship in the water. It is preferable that the elastic or spring suspension characteristics of spring 16 or band 17 be designed so that it is related to the weight of the learner. The presence of resilient tensile means absorbs sudden and disconcerting movements that the learner might otherwise experience to help overcome fear of sinking which often makes learning to swim difficult. At the beginning of instruction, the learner is completely supported in floating relationship by the instructor. It will be understood that the instructor can also perform these functions by standing or walking along the edge of a pool, float or pier and support the learner by a long pole (not shown) having a cord at its outer end, which cord is attached to handle 18. The learner is gradually encouraged to sustain himself in floating position and perhaps encouraged to dog paddle or attempt some other swimming stroke. When it becomes apparent to the instructor that the learner is gradually gaining confidence and some skill in sustaining himself in floating relationship, the instructor should slack off slightly on handle 18 so as to decrease the upward pulling force, but still maintain sufficient tension to prevent sudden sinking of the learner. The learner will hardly become aware of his gradual independence and being on his own, and will soon sustain himself completely in floating relationship by reason of the foregoing method and apparatus.

One advantage of the invention is that the learner quickly gains confidence and proficiency in floating and swimming because generally he is not conscious of the instructor slacking off on upward support. The foregoing techniques may be used to teach a learner to float on his back merely by reversing harness 11 with respect to the learner's torso.

It will be appreciated that the illustrated swimming instruction device has been designed to give the learner a feeling of security and thus confidence which is the most important requirement for successful swimming instructions. After five or six lessons, the learner should begin to sustain himself in the water. Each lesson should consist of three or four short periods of 10 to 15 minutes. When the learner consistently sustains himself, harness 11 may be set aside.

It is intended that all matter contained in the above description or shown in the accompanying drawings shall be interpreted as illustrative and not in a limiting sense.

What is claimed is:

A harness device adapted for supporting a person in floating relationship in water comprising, harness means engaging the upper torso portion of said person and characterized by allowing the person to have complete freedom of arm, head and torso movement, a holder adapted to be gripped, and resilient means connecting said harness and holder, whereby said person may be supported in relatively floating relationship in water by external means by gripping said holder means, said harness means comprising, a continuous loop of pliable material crossed over along the person's torso to form first and second loops, one end of the first of said loops being around the rear of said person, the second of said loops having individual segments extending under the person's arms, and end of the second loop being threaded between the first loop and said person, said holding means being connected to said second loop end.

References Cited in the file of this patent

UNITED STATES PATENTS

| | | |
|---|---|---|
| 644,593 | Gates | Mar. 6, 1900 |
| 1,080,462 | Kupfer | Dec. 2, 1913 |
| 1,238,380 | Bellan | Aug. 28, 1917 |
| 2,187,021 | Everson | Jan. 16, 1940 |

FOREIGN PATENTS

| | | |
|---|---|---|
| 423,067 | Great Britain | Jan. 24, 1935 |